United States Patent [19]
Webb

[11] Patent Number: 5,845,951
[45] Date of Patent: Dec. 8, 1998

[54] LEVER OPERATED BAG HOLDER

[75] Inventor: Roger M. Webb, Mount Holly, N.C.

[73] Assignee: Carolina Bag,Inc., Greenville, N.C.

[21] Appl. No.: 839,447

[22] Filed: Apr. 14, 1997

[51] Int. Cl.⁶ .................................................. A47F 5/10
[52] U.S. Cl. ...................... 294/159; 294/169; 224/925; 211/12
[58] Field of Search .................... 294/137, 158, 294/159, 162, 163, 164, 169, 170, 87.1; 211/12, 79–81, 85, 195, 198; 248/95, 97, 146, 150; 224/925; 296/37.5, 37.6, 37.16

[56] References Cited

U.S. PATENT DOCUMENTS

| | | | |
|---|---|---|---|
| 3,232,503 | 2/1966 | Thonen | 294/162 |
| 3,303,978 | 2/1967 | Brown | 294/159 |
| 4,190,182 | 2/1980 | Hickey | 294/159 |
| 4,226,348 | 10/1980 | Dottor et al. . | |
| 4,364,534 | 12/1982 | Valesko . | |
| 4,540,213 | 9/1985 | Herlitz et al. | 248/97 |
| 4,657,295 | 4/1987 | Holem | 294/162 |
| 4,723,743 | 2/1988 | Jenkins . | |
| 5,050,825 | 9/1991 | Bratset . | |
| 5,129,612 | 7/1992 | Beaupre . | |
| 5,287,971 | 2/1994 | Dorman . | |
| 5,340,183 | 8/1994 | Horian . | |
| 5,366,189 | 11/1994 | Thompson . | |
| 5,427,288 | 6/1995 | Trubee . | |
| 5,464,102 | 11/1995 | LeBlanc et al. . | |
| 5,484,091 | 1/1996 | Malinowski et al. | 224/925 |

Primary Examiner—Dean Kramer
Attorney, Agent, or Firm—Clifton Ted Hunt

[57] ABSTRACT

A lever operated bag holder used to stabilize a plurality of bags being transported. The invention is used to prevent the contents of the bags from being spilled. The device is designed to be used with various sized bags which are equipped with handles such as plastic grocery bags or other bags with handles. A lever device allows the apparatus to be operated with one hand. In the open configuration as viewed from the end the device has the shape similar to an inverted Y. In the closed configuration the invention is relatively flat and suitable for storage. The base has two parts acting as legs that are hinged to a central body. Extending from the top of the body are a plurality of inverted U shape hangers where the bag handles are placed and held together. On the ends of the body are dowel shaped hangers extending upward. In the central area of the invention is located a lever and its operating parts which open and close the apparatus by the use of a handle, rod and hinge sub-assembly. The invention has curved shaped hangers and bag handle stops which facilitate loading and unloading the invention.

9 Claims, 5 Drawing Sheets

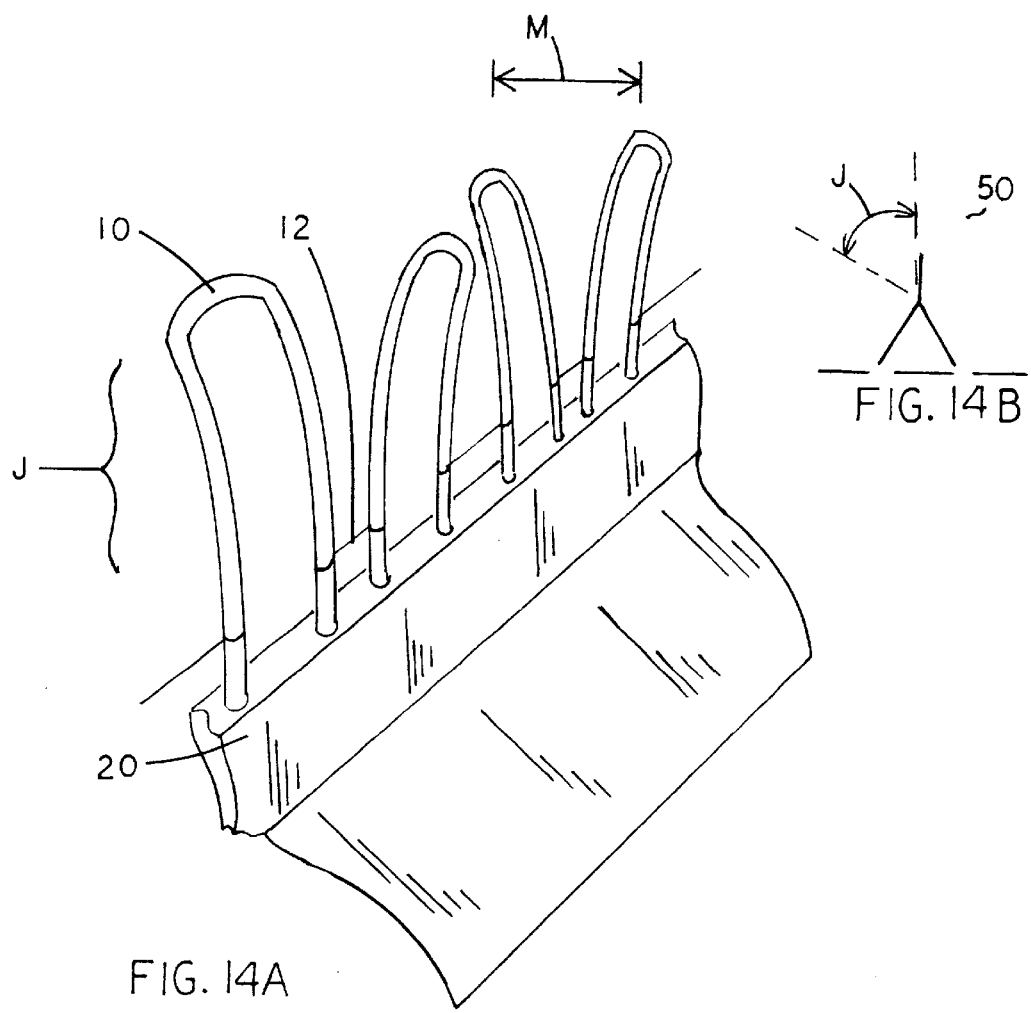
FIG. 14A
FIG. 14B
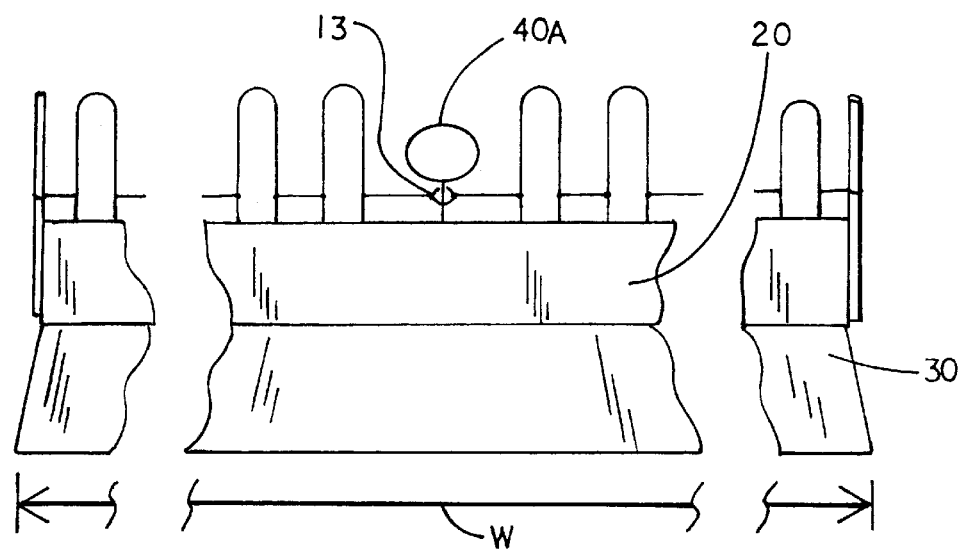
FIG. 15

1

LEVER OPERATED BAG HOLDER

BACKGROUND OF THE INVENTION

1. Field of the Invention

This invention relates to a lever operated apparatus for stabilizing grocery or retail bags during transit in a vehicle. Plastic bags with handles and paper bags with handles are used in grocery and retail stores. These bags present a problem in that when placed in the trunk, seat or other area of a vehicle the bags tend to spread open. The contents can spill out in transit. The plastic bags come in an assortment of sizes and the paper bags are typically larger than the plastic bags. The present invention relates to the type of apparatus that stabilizes bags during transit, suitable in use for a variety of size bags and may be operated with the use of one hand by a lever device. The present invention relates to such apparatus that is reducible in volume and shape to be suitable for storage.

2. Description of the Related Art

No prior art has been found which address the collective functions to which the present invention relates. Prior art have been designed to perform the primary function, however, not in the same manner nor to a similar degree as the subject. For example, U.S. Pat. No. 5,464,102 issued Nov. 7, 1995 to LeBlanc, et. al. is not readily suited to be used for both large and small bags at the same time. The notch on which the bag is placed is relatively shallow. The size of the bag suited for LeBlanc's invention is dependent on the height of the vertical member. Larger bags would require a notch in a higher position. Smaller bags could be added from the higher position, but would be suspended from the handles without support and tend to pull down on the vertical member. The vertical member of LeBlanc is folded to both sides of the base performing the function of a hinge. It is essential that bags be placed on both sides and in an equal manner for the vertical member to remain upright. There is no provision described for a removable clip or support of the vertical member otherwise described for the apparatus. In the specification LeBlanc indicates that the vertical member may be glued, cemented, stapled or otherwise secured in place which would make the inverted T shape permanent. This shape is not suitable for storage in most vehicles. According to claims 2 and 3 the apparatus is folded to a flat shape for storage. If no glue, cement or other device are used with LeBlanc the vertical member would tend to vacillate on the base folds. The normal operation of the apparatus would most probably require the use of both hands to make the three folds to its open position. When finished the folds are reversed and the user would use both hands. This device is not designed to be operated with one hand. The utility of this device is thus limited.

An apparatus to stabilize bags in transit is referenced in U.S. Pat. No. 5,427,288 issued Jun. 27, 1995 to Trubee. This design is of a rod shaped device resembling a removable shower curtain rod or a toilet paper dispenser. This apparatus has retractable hooks on the side to accommodate a plurality of bags. Although it could be used in a variety of vehicles its design is most readily suited for the back of a pick-up truck. The design performs a function similar to the subject, but requires a different approach. The utility of this device is thus limited.

A shopper's caddy is referenced in U.S. Pat. No. 5,366,189 issued Nov. 22, 1994 awarded to Thompson. Thompson's device is in the shape of an X as viewed from the top. Loading the back part of this device may be difficult in the confined spaces of some trunks. This is illustrated in FIG. 1 of Thompson's apparatus where a cut away portion of the vehicle is required to see the entire apparatus. The portion of Thompson's device behind the cut away would likewise be difficult to load. This apparatus is composed of two pieces which are fit together via a slot and would require the use of two hands to set up.

Additional prior art are a cargo partition referenced in U.S. Pat. No. 5,340,183 issued Aug. 23, 1994 to Horian; a rack for supporting loaded plastic grocery bags in U.S. Pat. No. 5,287,971 issued Feb. 22, 1994 to Dorman; and a collapsible stand for stabilizing grocery bags in transit in U.S. Pat. No. 5,129,612 issued Jul. 14, 1992 to Beaupre. These inventions address a similar problem of stabilizing articles in transit. However, these inventions are different in design and function in ways different to the present invention.

An invention preceding and similar to LeBlanc is U.S. Pat. No. 5,050,825 issued Sept. 24, 1991 to Bratset. Bratset's device comprises two pieces in which the upright member snaps onto a base. The vertical member has hangers in the form of inverted bowling pins. The hangers meet the objective of holding the bags. When removing the bag from the hanger it must be pulled and lifted to get it off of the upper and larger end of the hanger. The inverted bowling pin design impedes the removal of the bag from this device. As the last bags are lifted the vertical member of the device tends to follow the bag up. The operation of Bratset's apparatus requires the upright member to be unfolded and snapped into place and the operator would use both hands. The utility of this device is thus limited.

Inventions U.S. Pat. No. 4,723,743 issued Feb. 9, 1988 to Jenkins and U.S. Pat. No. 4,364,534 issued Dec. 21, 1982 to Valesko are stands for dispensing and filling plastic bags. These devices are used to hold plastic bags and not designed to be used for transport in a vehicle. U.S. Pat. No. 4,226,348 issued Oct. 7, 1980 to Dottor et. al. is a grocery bag holder generally designed to be used with paper bags. The utility of these devices are thus limited in comparison to the scope of the subject.

OBJECTIVE OF THE SUBJECT INVENTION

The primary objective of the present invention is to stabilize and prevent shopping bags from spilling the contents while being transported in motor vehicles. The secondary objective is to develop such invention that is operated with one hand. Additional objectives of the present invention include a device which is suitable for use with various size bags and one which allows the bags to be attached in a compact space to be loaded and unloaded with minimal impedance. The scope of the subject is to develop an invention employing a lever device allowing it to be opened and closed with one hand. In the closed position the apparatus has a flat shape and reduced volume being suitable for storage. The present invention is an apparatus which is effective, simple to use and provides a greater utility than the related prior art. An invention meeting all these objectives was not found in a search of the prior art. It is heretofore found there is a present need for the subject invention.

SUMMARY OF THE INVENTION

The purpose for the invention is to provide a simple to use apparatus which will prevent grocery and retail bags from spilling their contents during transit. The invention has a lever device and is operated using one hand. The function of this apparatus is to provide a platform which will hold together the handles of the bags that in turn prevents the contents of the bags from being spilled. The bags are placed over hangers which are vertically elongated at the top of the apparatus. The bag handles are held together in this manner to prevent spillage during transit. Features of the hangers include a bag handle stop and a curved shape which facilitate loading and unloading the apparatus. The hangers are made to accommodate large bags and at the same time are suited for smaller bags. The weight of the bags provides an anchor for the subject apparatus. The lever used to open the invention is also used to close the apparatus. In the closed position the invention has a relatively flat shape and reduced volume making it suitable for storage. The shape and working parts of the subject are so configured to function in a manner that meets the objective of the present invention.

BRIEF DESCRIPTION OF THE DRAWINGS

The subject is symmetrical. The side views are the same. Also, the end views are similar. The reference numerals refer to physical parts of the subject invention. Letters and suffix letters are used to reference the operation of the invention or a construction detail. The scale may vary from Figure to Figure as is necessary to show greater detail. Please refer to the Addenda for the following Figures:

FIG. 14A is a close up and cut away perspective view illustrating the bend in the hanger and other details. FIG. 14B is a stick figure depiction showing the acceptable range for the hanger bend.

FIG. 15 is a side view illustrating additional embodiments.

DETAILED DESCRIPTION OF THE PREFERRED EMBODIMENTS

Drawing FIGS. 1 through 15 provide discovery of the preferred embodiments for an apparatus that is advanced in design, superior in functional utility and providing greater conveniences to the operator than the related prior art. The embodiments are a result of extensive consideration afforded to the function, performance and science behind the present invention. The embodiments of this invention are a collection of elements some being conceived for the first time in the related field distinguishing the subject as a true novelty.

Figure 1:
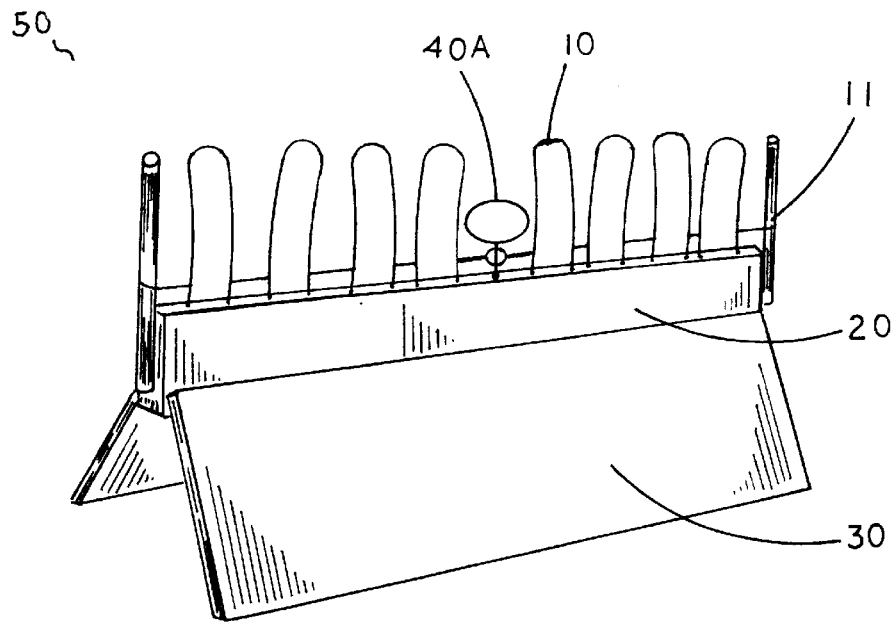
FIG. 1 provides a perspective view of the subject apparatus in the opened and ready to use position. The unit is shown unloaded to increase the details of this view.
Figure 2:
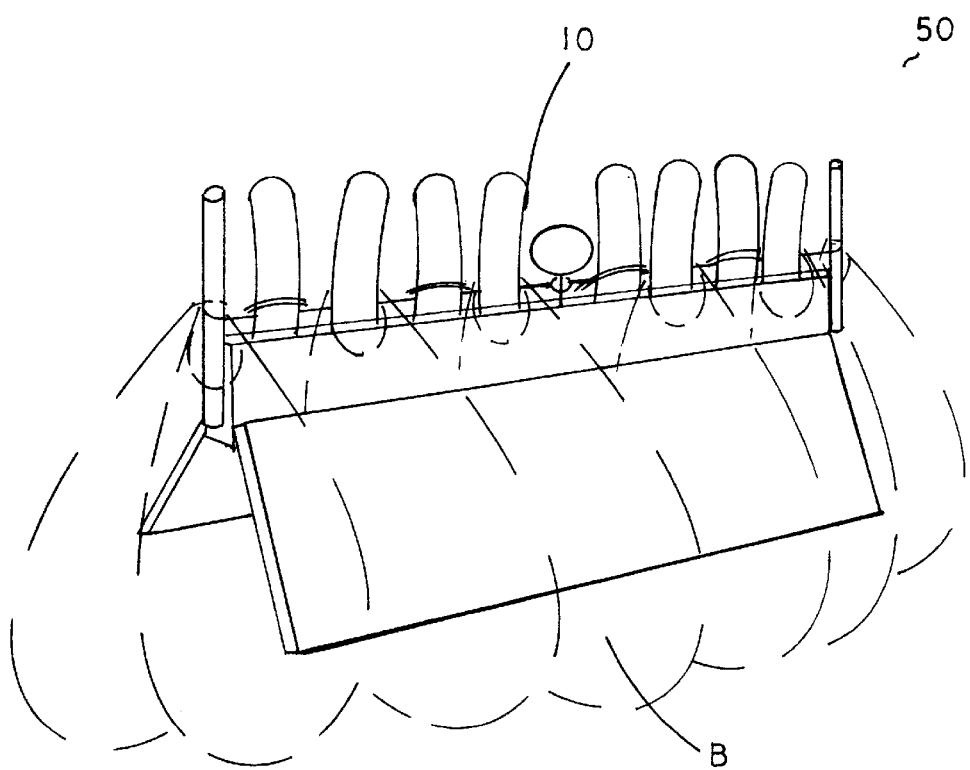
FIG. 2 provides a perspective view of the subject apparatus being opened and loaded with bags. This view is intended to demonstrate the utility of the device.

FIGS. 1 and 2 disclose perspective views of a lever operated apparatus 50 designed to stabilize a plurality of filled bags equipped with loop handles being transported. In FIG. 1 the lever handle 40A is shown in the down position indicating the subject is in the open and ready to load position. FIG. 1 displays an embodiment of the apparatus with a central body 20 having a plurality of elongated inverted U shape hangers 10 which extend up from the central body 20. End rods 11 shown in FIG. 1 are in the shape of a dowel and function to prevent the bag handles from the adjacent hanger from lapping over the end. In addition the end rods 11 may be used for handling additional bags. An embodiment of the apparatus is that the end rods 11 and the hangers 10 extend a length above the body 20 in the range of 20 to 70 percent, as designated L in FIG. 3, of the total height of the opened apparatus as designated N in FIG. 3. In FIG. 1 the central body 20 is hinged to the legs or base members 30 that are composed of two members being approximately the same length as the body.

FIG. 2 shows the subject apparatus 50 as loaded with bags B. The bags B are indicated by dashed lines being suspended from the hangers 10. This Figure is intended to demonstrate the utility of the invention and disclose the embodiment that the apparatus is designed to stabilize a plurality of filled bags. The purpose for two similar figures is because in FIG. 2 the dashed lines of the bags tend to confuse the design features of the subject. FIG. 1 is shaded indicating surface delineation. FIG. 2 the shading is omitted of the subject to increase the detail of the dashed lines indicating the bags B.

Figure 3:
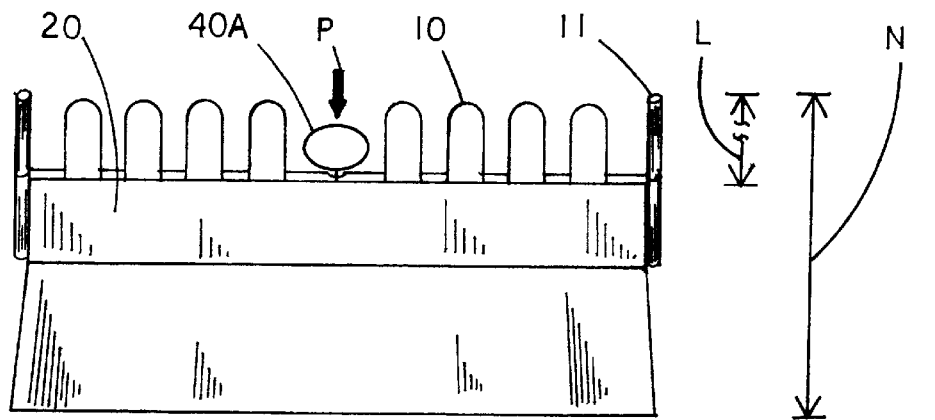
FIG. 3 is a side view of the apparatus being opened and ready to use.

FIG. 3 item P indicates the lever handle 40A is pushed down and the invention is in the open and ready to use position. The length of the hangers designated L in FIG. 3 may be in the range of 20 to 70 percent of the total height of the opened apparatus as designated N in FIG. 3. The length L of the hanger would be made longer to accept larger bags. This allows the device to be used with a range of bags varying from small to larger bags.

Figure 4:
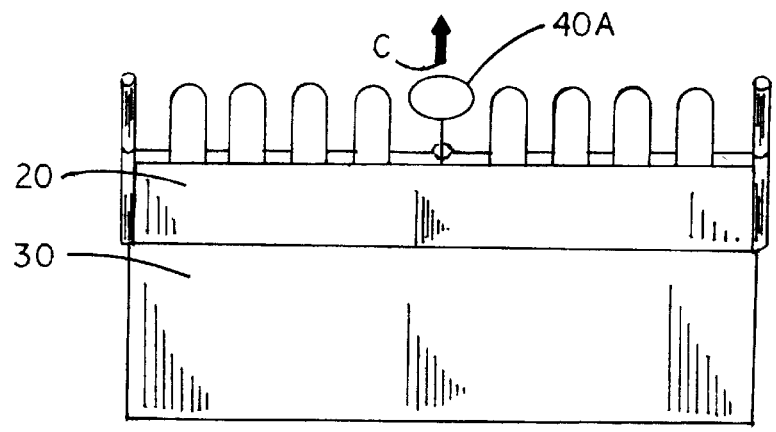
FIG. 4 is a side view of the apparatus being closed and ready to store.

FIG. 4 item C indicates the lever handle 40A is pulled up and the invention is in the closed position. This view discloses a side view of the embodiment of the central body member 20 and a leg or base member 30.

Figure 5:
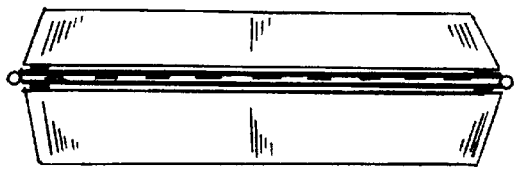
FIG. 5 is a top view of the apparatus as opened.

FIG. 5 is a top view of the subject apparatus 50.

Figure 6:
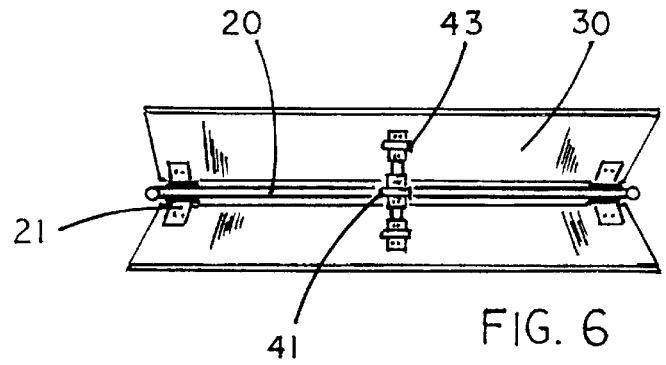
FIG. 6 is a bottom view of the apparatus as opened.

FIG. 6 is a bottom view showing the body to base hinges 21 which are located at the four corners where the body member 20 meets the base member 30. Additional hinges may be added in the central region for increased strength. Partial detail can be distinguished of the lever sub-assembly hinges with the center hinge 41 being connected to the base lever hinges 43. These parts are shown in greater detail in FIGS. 11, 12 and 13.

Figure 7:
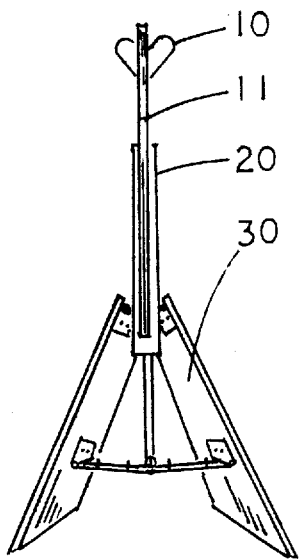
FIG. 7 is an end view of the apparatus as opened.

FIG. 7 is an end view showing only the bent out portion of the hanger 10 near the top. The end rod 11 tends to obscure the view of the body 20 and the hangers 10. The dominant feature from this view and a preferred embodiment is the inverted Y shape of the present invention in the open position. The base members 30 as seen alone form an inverted V shape which is an additional embodiment in the open position. The inverted V configuration of the base pushes the bags away from the center of the apparatus and this action draws the bag handles together on the hangers.

Figure 8:
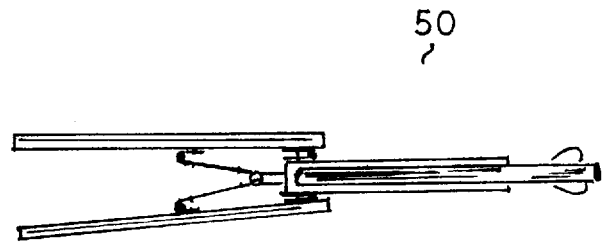
FIG. 8 is an end view of the apparatus as closed.

FIG. 8 is an end view showing the subject apparatus 50 in the closed position. The subject is shown in a horizontal position as the method of storage is to be laid flat. The closed device being substantially flat and reduced volume as displayed in FIG. 8 and FIG. 10 is an embodiment of the invention.

Figure 9:
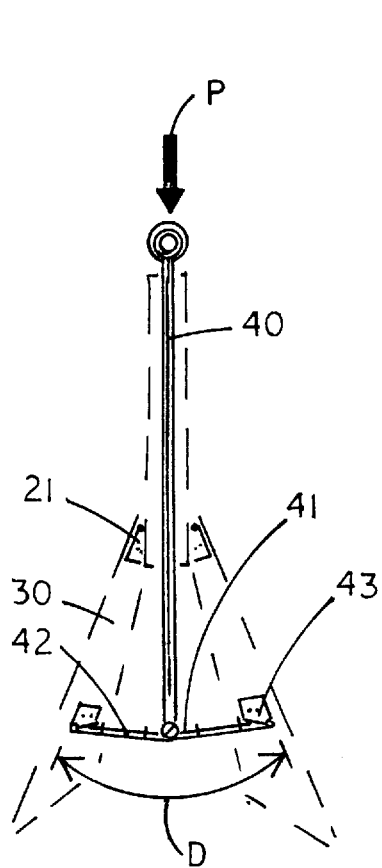
FIG. 9 is a cross sectional end view in the opened position.
Figure 13:
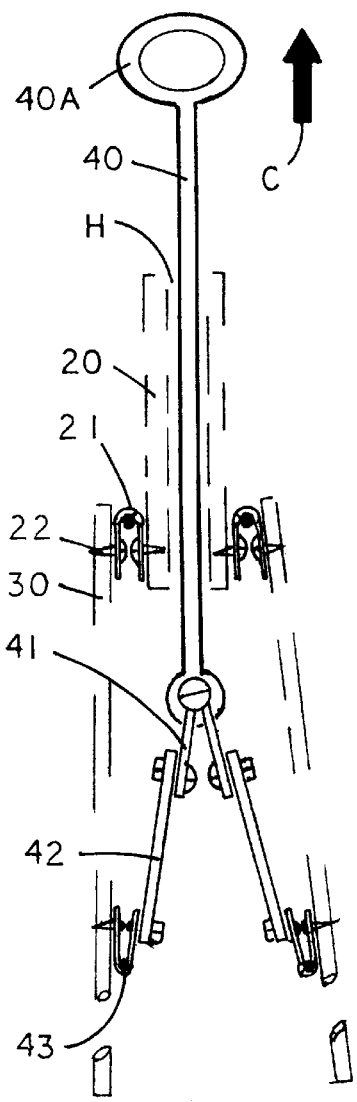
FIG. 13 is a cross section end view showing the lever device, as well as, the hinge details for the base to body hinges.

FIG. 9 is a cross section end view with the action arrow P indicating the lever rod 40 is in the down and open position. The center lever hinge 41 and base lever hinges 43 are shown in the open position. The plane of view is generally the central portion of the lever sub-assembly. However, the body to base hinge 21 is observed in this view which is in a closer plane. These are shown together to increase the comprehension of these working parts. The operating angle of the base members 30 is designated as item D in FIG. 9. This angular degree D between the base members in the open position may vary in the range of 20 to 120 degrees which is an embodiment of the invention. Accordingly, the hinged base members 30 move from a closed position of 0 degrees to as much as in the range of 10 to 60 degrees each to the open position. The movement of the base members being from 0 to 60 degrees each is a preferred embodiment of the apparatus. The lower end of the lever rod 40 in FIG. 9 is connected to the center hinge 41 which is in turn connected to two connecting plates 42. The connecting plates 42 are connected to the base hinges 43 which are attached to the base members 30 shown as dashed lines in FIG. 9. As the rod 40 is pushed down the three hinge sub-assembly is spread and opens the base to form the inverted Y configuration of the subject apparatus as viewed from the end. This forms a stable platform when the subject is open. As shown in FIG. 13, the lever rod 40 serves a secondary purpose. Without the lever rod 40 the central body 20 would vacillate on the hinged base members 30. Said body 20 and base 30 are shown as dashed lines in FIG. 13. The lever rod 40 provides vertical support for the body and corrects this potential problem.

Figure 10:
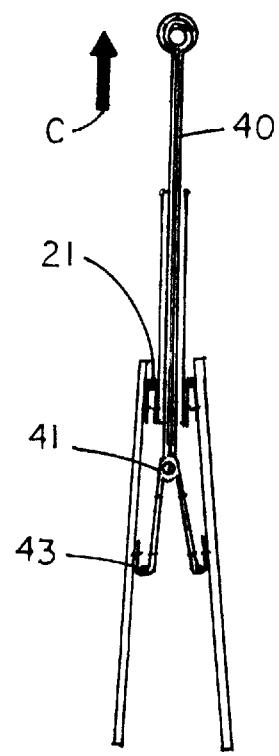
FIG. 10 is a cross sectional end view in the closed position.

FIG. 10 is a cross section end view with the action arrow C indicating the lever rod 40 is in the up and closed position. The center lever hinge 41 and the base lever hinge 43 are shown closed in this Figure. The plane of view is generally the central portion of the lever sub-assembly. However, the body to base hinge 21 is observed in this view which is in a closer plane. These are shown together to increase the comprehension of these working parts.

Figure 11:
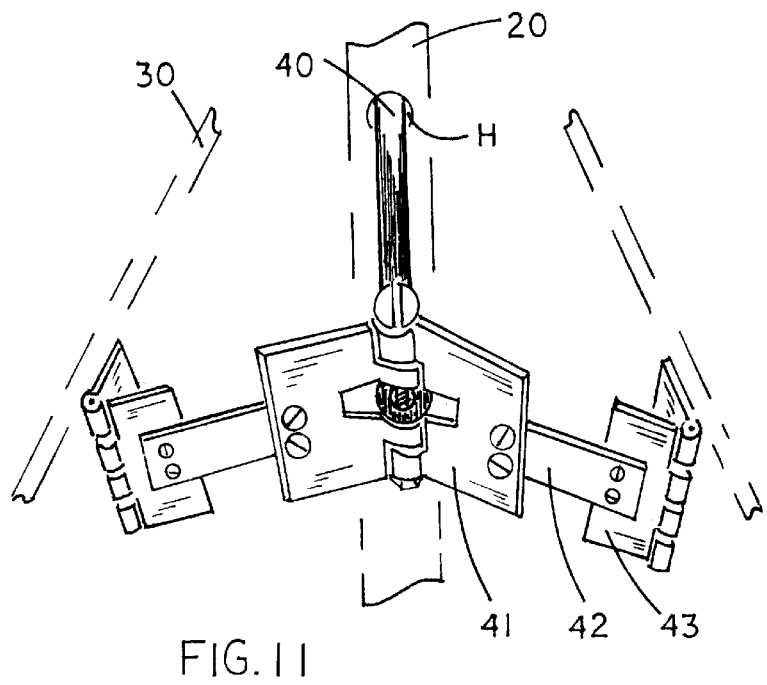
FIG. 11 is a close-up perspective view from the bottom of the lever hinge sub-assembly. The subject is depicted for this drawing in a position approximately half way between opened and closed.

FIG. 11 is a close up perspective view from the bottom of the lever hinge assembly. The body 20 and the base 30 are shown as dashed lines. A hole designated as H in the body 20 receives the lever rod 40. The lever rod extends down to the center hinge 41 which is connected to the base lever hinges 43 via a connecting plate 42.

Figure 12:
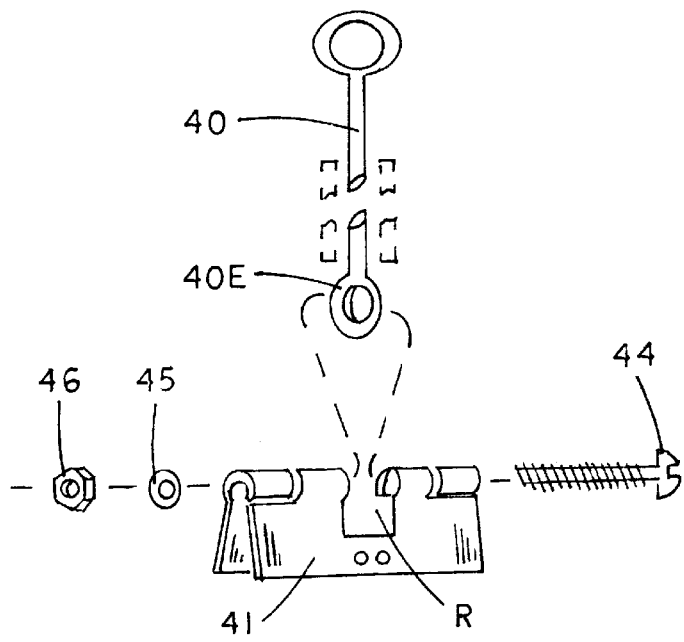
FIG. 12 is a close-up exploded side view of only the center hinge portion of the lever sub-assembly.

FIG. 12 is an exploded view of only the center lever hinge assembly. The center hinge 41 is modified from a normal hinge. An area in the middle of the hinge designated R has been removed to receive the end of the lever rod 40E. As illustrated in FIG. 12 a hinge pin bolt 44 is passed through the hinge 41 and lever rod end 40E together and secured with a washer 45 and nut 46.

FIG. 13 is a cross section end view showing a portion of the subject apparatus in the closed position. The plane of view is generally the central portion of the lever sub-assembly. However, the body to base hinge 21 is observed in this view which is in a closer plane. These are shown together to enable a greater comprehension of these working parts. The lever rod 40 is shown extending through the body 20 via the hole H to the center hinge 41. The center hinge 41 is connected to the lever base hinges 43 via a connecting plate 42. The body to base hinge 21 is shown in this view attached to the base 30 with a screw 22. The working parts being the base to body hinges 21 and the lever sub-assembly parts 40, 41, 42 and 43 are preferred embodiments of this apparatus. As shown in FIG. 13 to close the device the handle 40A is pulled up indicated by C which in turn pulls up the rod 40 and the hinged sub-assembly 41, 42 and 43 come together. As the hinged sub-assembly is pulled up the base members come together to form a substantially flat configuration which is an embodiment of this device. The flat configuration provides for suitable storage. Opening and closing the device is accomplished with the use of one hand. This lever device is superior to and a unique contrivance in comparison to the related prior art. The lever device as disclosed in FIGS. 9, 10, 11 and 13 is a preferred embodiment of the invention.

FIG. 14A is a close up and cut away view showing the hanger 10 details. In order to facilitate removal of the bags from the unit a bag handle stop 12 has been devised which is an embodiment of the apparatus. This stop 12 is attached to the hangers 10 and functions to prevent the bag handle from reaching the apparatus body 20. A space is thus provided so that the operator may insert a finger to wrap around the handle and pull the bag up and off the subject. The finger can wrap around the handle without having to come in contact with the body member of the invention. Without this space the bag handle would rest upon the body 20 and be difficult to remove as it would be necessary for the finger to come in contact with the body 20. The location of the stop 12 is above the central body 20 and below the middle of the hanger 10 being approximately one inch above the body of the invention and near the bottom of the hanger. The stop 12 is horizontally positioned and ties the hangers together, but does not extend into the area inside the inverted U of the hanger. A secondary benefit from the bag handle stop is that by tying the hangers together in this manner gives the hangers additional strength and support.

The hangers have a curve shape with the location shown as J in FIG. 14A. This bend occurs between the bottom and the top of the hanger 10. This curve serves the function of making the apparatus easier to load and unload which is an embodiment of the apparatus. When unloading the curve of the hanger slopes away from the bag handle as it is lifted up and off this device. In FIG. 14B a stick figure end view of the subject invention 50 is shown indicating the bend range of the curve J. The hanger is curved away from the perpendicular in the range of between 1 and 70 degrees as indicated by J in FIG. 14B which is a preferred embodiment of this invention.

The hangers are curved in alternating sequence so that every other hanger is bent in the same direction as illustrated in FIG. 14A. The hangers are curved in alternating directions it allows a slightly greater distance between the hangers at the top. The marginal distance, designated as M in FIG. 14A, between the hangers is increased by the curve which gives more room to load and unload. This marginal distance M is an aid in getting the bags on and off the apparatus while providing a compact configuration. In addition to the bend, the elongated shape of the hanger allows for the bag to be lifted up and off with minimal resistance. The configuration of the hangers increase the utility of the device. The hangers comprise a length in the range of 20 to 70 percent of the total height of the apparatus which is an embodiment of this invention and designated L on FIG. 3. Large bags will require a hanger that extends to a length greater than the top of the bag handle. The subject invention may be simultaneously used for smaller bags which will rest along the hanger or on the handle stop 12 in FIG. 14A. Hence, the apparatus may be used to accept bags of various sizes.

FIG. 15 shows an additional embodiment of the invention in a cut away side view. Item 40A is the lever handle which is in the down and open position. FIG. 15, item 13 is the lever handle stop which functions to prevent to the lever hinges from over extending. This stop is placed at the point of downward travel for the lever rod handle 40A in FIG. 15 which coincides with the opened position of the lever hinges as shown in FIGS. 7 and 9.

The length designated as W in FIG. 15 of the body 20 and base members 30 may be increased to accommodate a greater, or decreased to accommodate a lesser, plurality of hangers 10 which is an embodiment of the invention. The length of the body W can be determined as a function of the number of bags to be stabilized.

The bags are supported by the site area surface while the handles are being held together by the hangers on the apparatus. Bags are placed on alternating sides from hanger to hanger. Every other hanger is spaced apart approximately the width of one filled bag. Hence, the space between each hanger in sequence on the top of the body will be approximately one-half the width of a filled bag. As alternating hangers are used the filled bags will have adequate space whereon to be placed.

The design is made so that the majority of the weight of the bags rests on the same surface upon which the apparatus is placed. As bags are added the center of gravity is lowered. The weight of the bags provides an anchor for this apparatus when in use. The invention meets the objectives for its purpose providing an apparatus which stabilizes bags in transit, prevents the spillage of the contents and is simple to use.

The disclosure is made herein by the drawing FIGS. 1 through 15 and as illustrated are the preferred embodiments of the subject apparatus. The present invention and its working parts can be constructed from suitable rigid or semi-rigid materials including but not limited to plastic, metal, wire, wood, hardboard or paperboard products. It is not the intent to limit the spirit nor scope of the subject apparatus by the narrative description and claims. As documented herein and finding support on an antecedent basis;

I claim:

1. Apparatus for stabilizing during transit a plurality of flexible bags having loop handles and containing diverse articles, the apparatus comprising:

a central body;

means for supporting the central body in an operative position;

means for releasably supporting the plurality of bags;

means for collapsing the apparatus to an inoperative position; and said means for collapsing the apparatus to an inoperative position comprising a manually actuated lever and means for hingedly interconnecting the lever with the means for supporting the central body in an operative position.

2. The apparatus of claim 1 wherein the means for supporting the central body in an operative position includes a pair of base members, and means interconnecting the central body and the pair of base members for movement of the base members relative to the central body between an operative position and an inoperative position of the apparatus.

3. The apparatus of claim 2 wherein the means interconnecting the central body and the pair of base members includes the manually actuated lever.

4. The apparatus of claim 3 wherein the means interconnecting the central body and the pair of base members comprises the lever, a center hinge, and a pair of base member hinges connected to the center hinge and to respective base members.

5. The apparatus of claim 1 wherein the means for releasably supporting the plurality of bags comprises a plurality of upwardly extending and longitudinally spaced hangers.

6. The apparatus of claim 5 wherein each or the hangers is of inverted U-shaped configuration, and the open ends of the hangers are joined to the central body.

7. The apparatus of claim 5 wherein alternate hangers curve upwardly and outwardly from the central body in the opposite direction from adjacent hangers.

8. The apparatus of claim 6 wherein bag stops extend upwardly from the central body between the hangers.

9. Apparatus movable between a collapsed position for storage and all operable position for stabilizing during transit a plurality of flexible bags having loop handles and containing diverse articles, the apparatus comprising:

a central body of planar rectangular configuration, including side walls and upper and lower walls;

a plurality of hangers extending upwardly from the upper wall of the central body to receive the loop handles of the bags;

a pair of base members, each base member being of planar rectangular configuration and including side walls and upper and lower walls;

base hinges connecting the base members to the central body;

a center hinge;

base lever hinges connected to the center hinge and to the base members;

a manually actuated lever mounted for vertically reciprocable movement in the central body and extending through the upper and lower walls of the central body; and the lever terminating in a handle above the central body and terminating at its lower end between the base members and in an operable connection with the center hinge;

whereby movement of the lever in one direction will move the base members together to collapse the apparatus for storage and movement of the lever in the opposite direction will move the base members apart to support the apparatus in an operable position to stabilize the bags during transit.

* * * * *

UNITED STATES PATENT AND TRADEMARK OFFICE
CERTIFICATE OF CORRECTION

PATENT NO. : 5,845,951
DATED : December 8, 1998
INVENTOR(S) : Roger M. Webb

It is certified that error appears in the above-identified patent and that said Letters Patent is hereby corrected as shown below:

Title page, item [73], Assignee: the correct name and address should read-- Carolina Bag Butler, Inc., Greenville, South Carolina--.

Signed and Sealed this

Twenty-seventh Day of June, 2000

Attest:

Q. TODD DICKINSON

Attesting Officer

Director of Patents and Trademarks